(12) United States Patent
Kawamoto et al.

(10) Patent No.: US 8,440,935 B2
(45) Date of Patent: May 14, 2013

(54) AUTOMATIC WELDING EQUIPMENT

(75) Inventors: Atsuhiro Kawamoto, Hyogo (JP); Kei Aimi, Osaka (JP); Yasushi Mukai, Osaka (JP); Yukinori Hirota, Hyogo (JP)

(73) Assignee: Panasonic Corporation, Osaka (JP)

(*) Notice: Subject to any disclaimer, the term of this patent is extended or adjusted under 35 U.S.C. 154(b) by 0 days.

(21) Appl. No.: 12/066,736

(22) PCT Filed: Jul. 20, 2007

(86) PCT No.: PCT/JP2007/064334
§ 371 (c)(1),
(2), (4) Date: Mar. 13, 2008

(87) PCT Pub. No.: WO2008/050513
PCT Pub. Date: May 2, 2008

(65) Prior Publication Data
US 2010/0059492 A1 Mar. 11, 2010

(30) Foreign Application Priority Data
Oct. 27, 2006 (JP) ................................. 2006-292142

(51) Int. Cl.
*B23K 9/10* (2006.01)

(52) U.S. Cl.
USPC ........................................ 219/130.1; 219/136

(58) Field of Classification Search ............... 219/130.4, 219/130.33, 130.5, 130.51, 137 PS
See application file for complete search history.

(56) References Cited

U.S. PATENT DOCUMENTS

| | | | | |
|---|---|---|---|---|
| 5,994,659 A | * | 11/1999 | Offer | 219/75 |
| 6,570,131 B1 | * | 5/2003 | Stava | 219/130.4 |
| 2002/0117489 A1 | * | 8/2002 | Arndt et al. | 219/130.5 |

FOREIGN PATENT DOCUMENTS

| | | | |
|---|---|---|---|
| JP | 57-189676 U | | 12/1982 |
| JP | 64-048675 A | | 2/1989 |
| JP | 64-48675 A | | 2/1989 |
| JP | 5-329647 A | | 12/1993 |
| JP | 05-329647 A | | 12/1993 |
| JP | 08-039253 | * | 8/1994 |
| JP | 08-039253 | * | 2/1996 |
| JP | 08-039253 A | | 2/1996 |
| JP | 8-39253 A | | 2/1996 |
| JP | 09-001334 A | | 1/1997 |
| JP | 2000-176641 A | | 6/2000 |
| JP | 2000176641 A | * | 6/2000 |
| JP | 2003-170272 A | | 6/2003 |
| JP | 2006-055886 A | | 3/2006 |
| WO | WO 89/01380 A1 | | 2/1989 |
| WO | WO 8901380 A1 | * | 2/1989 |

OTHER PUBLICATIONS

International Search Report for Application No. PCT/JP2007/064334, dated Oct. 30, 2007.

(Continued)

*Primary Examiner* — Henry Yuen
*Assistant Examiner* — Thien S Tran
(74) *Attorney, Agent, or Firm* — RatnerPrestia

(57) ABSTRACT

A welding control unit has a common power section for detecting contact of a welding material and for welding. A material contact detector for detecting contact of the welding material and a workpiece, and a power controller are built in the welding control unit. This stabilizes a bead shape in starting welding. The number of components can also be reduced, resulting in more inexpensive equipment. In addition, only a space for installing the welding control unit is needed without any additional space.

19 Claims, 7 Drawing Sheets

OTHER PUBLICATIONS

Supplementary European Search Report for EP 07 79 1072, Sep. 4, 2009.
Japanese Office Action for Application No. 2007-554371, Feb. 15, 2011, Panasonic Corporation.

Chinese Office Action for Application No. 200780001205.X, Sep. 6, 2010, Panasonic Corporation.

* cited by examiner

AUTOMATIC WELDING EQUIPMENT

TECHNICAL FIELD

The present invention relates to automatic welding equipment that carries out welding by producing an arc between a non-consumable electrode and a workpiece to be welded, and automatically feeding a welding material to the arc produced.

BACKGROUND ART

In the welding industry, the need for improved productivity has led to an increase in demand for high-speed welding with less spattering combined with reliable high quality. Faster welding speeds increase the production quantity per hour, and less spattering reduces the time spent in post-processing for removing spatter attached to workpieces, resulting in improved welding productivity. In particular, if spatter adheres to a component whose appearance is important, the product's value drastically drops. Adhesion of spatter to such components thus needs to be prevented. For this purpose, automatic welding equipment combining the use of a non-consumable electrode that does not generate spatter and a welding material is increasingly being adopted.

Conventional automatic welding equipment achieves high-quality welding without spatter adhesion. However, it is extremely important to secure an appropriate distance among the non-consumable electrode, the welding material (hereinafter also referred to as a "filler wire"), and the welding workpiece (hereinafter referred to as the "workpiece"). In this connection, a method of controlling current running through the welding material is disclosed. (For example, refer to Patent Document 1.)

The conventional automatic welding equipment is described next with reference to FIG. 7, which is a schematic view of conventional automatic welding equipment. As shown in the drawing, the conventional automatic welding equipment includes welding power source 302 that applies welding voltage between tungsten electrode 301, which is a non-consumable electrode, and workpiece 305 to produce welding arc 308; and filler wire power source 303 that supplies power to wire chip 307. Current measuring section 313 is connected between filler wire power source 303 and workpiece 305. Current measuring section 313 is also connected to filler wire current detector 316. Filler wire current detector 316 detects the current running in wire chip 307 via current measuring section 313. Filler wire current detector 316 recognizes the detected current as the current value running in the filler wire, and outputs the value to filler wire vertical movement determination section 310 and threshold current calculator 314.

In the above configuration, an operator lowers filler wire 306 toward a weld pool until it contacts the weld pool. When the operator confirms the contact of filler wire 306 and the weld pool, lowering of filler wire 306 is stopped. A filler wire feeding control procedure is then executed. Welding takes place while comparing the filler wire current value with a reference value. If the filler wire current value changes out of the reference value, the equipment is controlled to stop the supply of current to filler wire 306.

In the conventional automatic welding equipment as configured above, however, no means is provided for detecting a tip position of filler wire 306 in starting welding. Accordingly, the shape of the weld bead in starting welding is variable.

Patent Document 1: Japanese Patent Unexamined Publication No. H9-1334.

SUMMARY OF THE INVENTION

Automatic welding equipment of the present invention includes a welding torch with a non-consumable electrode, an actuator for holding the welding torch and moving the welding torch, a material feeder for feeding a welding material to a welding position, a power section for supplying power between the non-consumable electrode and the workpiece and between the welding material and the workpiece, and a material voltage detector for detecting voltage between the welding material and the welding workpiece. The equipment also includes a material contact detector for detecting contact between the welding material and workpiece by receiving an output from this material voltage detector, and a non-consumable electrode voltage detector for detecting voltage between the non-consumable electrode and the workpiece. The equipment further includes a non-consumable electrode contact detector for detecting contact between the non-consumable electrode and the workpiece by receiving an output from the non-consumable electrode voltage detector; an actuator controller for controlling an actuator based on at least a detection result of the material contact detector and a detection result of the non-consumable electrode contact detector; and a power controller for controlling the power section.

In this configuration, the material contact detector detects a timing at which the contact of the welding material and workpiece is released after the welding material and the workpiece are placed in contact in starting welding. Based on this timing, the power controller increases power supplied between the non-consumable electrode and the workpiece from power for starting arc to power for main welding, which is higher than the power for starting arc. This stabilizes the shape of weld bead in starting welding.

After completing welding, the non-consumable electrode contact detector detects whether or not the non-consumable electrode and the workpiece are in contact with each other. If the non-consumable electrode and the workpiece are in contact with each other, the actuator controller at least alerts the contact state of the non-consumable electrode and the workpiece, or stops and holds movement of the non-consumable electrode by the actuator.

Still more, after completing welding, the material contact detector detects whether or not the welding material and workpiece are in contact, and the non-consumable electrode voltage detector detects whether or not the non-consumable electrode and the workpiece are in contact with each other. If they are in contact, the contact is alerted. If the material and the workpiece are in contact with each other, the actuator controller stops and holds the movement of the welding material by the actuator. If the non-consumable electrode and the workpiece are in contact with each other, the actuator controller stops and holds the movement of the non-electrode by the actuator.

Still more, the automatic welding equipment of the present invention includes a welding torch with a non-consumable electrode, an actuator for holding the welding torch and moving the welding torch, a material feeder for feeding a welding material to a welding position, a power section for supplying power between the non-consumable electrode and the workpiece and between the material and the workpiece, and a material current detector for detecting the current running in the welding material. The equipment also includes a material contact detector for detecting that the contact of the welding material and the workpiece when the current detected by the material current detector exceeds a predetermined level, and a non-consumable electrode voltage detector for detecting voltage between the non-consumable electrode and the workpiece. The equipment further includes a non-consumable electrode contact detector for detecting the contact of the non-consumable electrode and the workpiece on receiving an output from this non-consumable electrode voltage detector, an actuator controller for controlling the actuator based on a detection result of the material contact detector or a detection result of the non-consumable electrode contact detector, and a power controller for controlling the power section.

The material contact detector detects whether or not the welding material and the workpiece are in contact with each other after completing welding. If the welding material and the workpiece are in contact with each other, at least the contact state is alerted, or the movement of the welding material by the actuator is stopped and held. The non-consumable electrode contact detector detects whether or not the non-consumable electrode and the workpiece are in contact with each other after completing welding. If the non-consumable electrode and the workpiece are in contact with each other, at least the contact state is alerted, or the movement of the non-consumable electrode by the actuator is stopped and held.

As described above, the present invention stabilizes the shape of weld bead in starting welding. In addition, the number of components can be reduced by sharing a power source for detecting the contact of welding material and for welding, and installing the material contact detector for detecting the contact between the material and the workpiece inside the welding control unit. This results in inexpensive equipment. In addition, only a space for installing the welding control unit is needed without any additional space.

Figure 1:
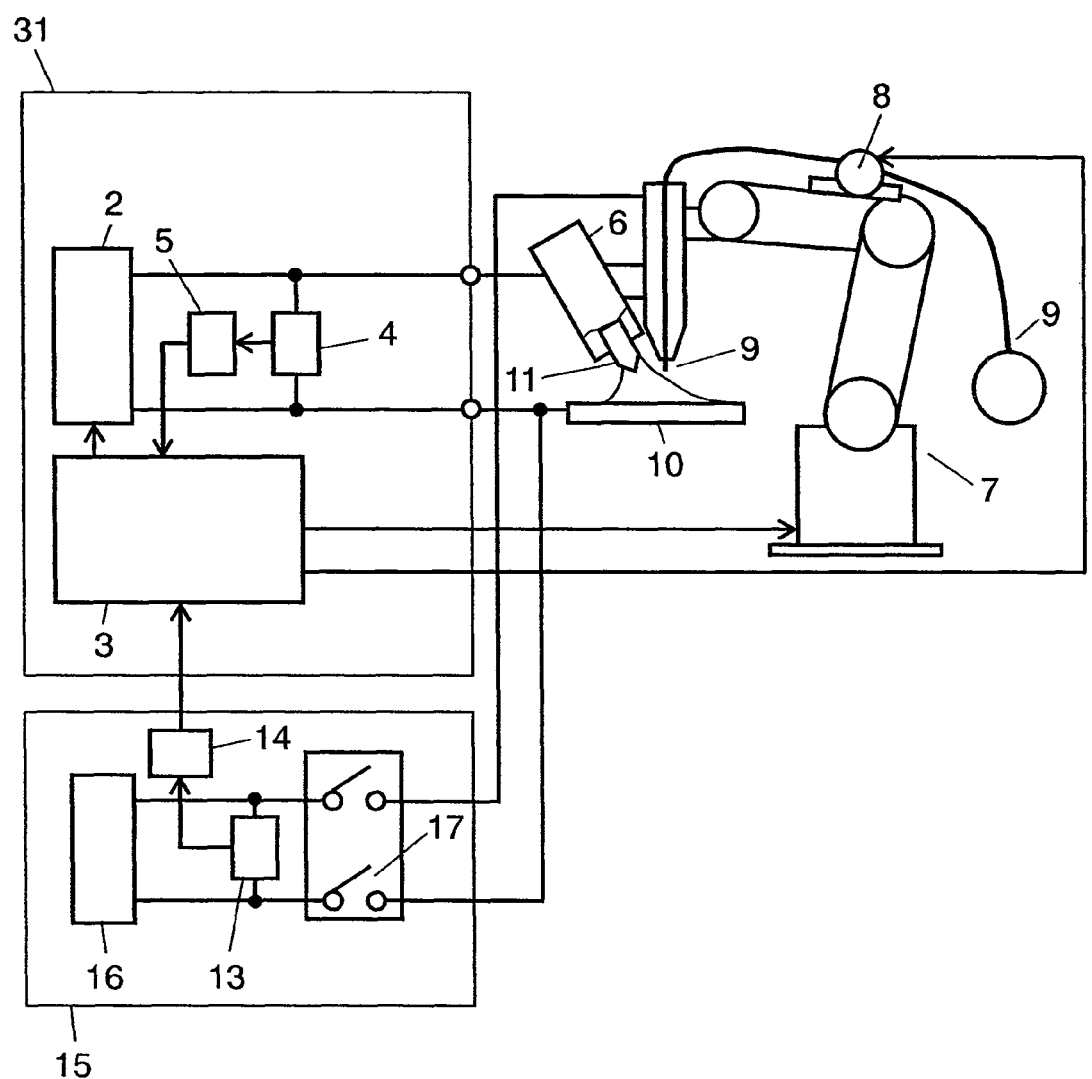
FIG. 1 is a schematic view of automatic welding equipment.

REFERENCE MARKS IN THE DRAWINGS 1, 21, 31 Welding control unit
2 Power section
3 Controller
4 Non-consumable electrode voltage detector
5 Non-consumable electrode contact detector
6 Welding torch
7 Actuator
8 Material feeder
9 Welding material
10 Workpiece
11 Non-consumable electrode
12 First switch
13 Material voltage detector
14 Material contact detector
15 Material contact detection unit
16 Material contact detection power section
18 Material current detector
19 Second switch
56 Power controller
57 Actuator controller
58 Material feeding controller

DETAILED DESCRIPTION OF PREFERRED EMBODIMENTS

First, technical information related to the present invention is described before exemplary embodiments of the present invention. Inventors of the present invention examined the structure of automatic welding equipment with the aim of overcoming a disadvantage that has been raised. FIG. 1 is a schematic view of the automatic welding equipment that has been examined. This automatic welding equipment is mainly configured with welding control unit 31, material contact detection unit 15, and actuator 7. The structure and operation of the automatic welding equipment shown in FIG. 1 are described next.

In FIG. 1, welding control unit 31 includes power section 2, controller 3, non-consumable electrode voltage detector 4, and non-consumable electrode contact detector 5. Welding torch 6 with non-consumable electrode 11 and material feeder 8 for supplying welding material 9 are provided on actuator 7. Material contact detection unit 15 that detects contact between welding material 9 and workpiece 10 includes material voltage detector 13 for detecting the voltage between welding material 9 and workpiece 10, and material contact detector 14 for detecting whether or not welding material 9 and workpiece 10 are in contact by receiving an output signal from material voltage detector 13. Material contact detection unit 15 also includes material contact detection power section 16 for supplying voltage for detecting whether or not welding material 9 and workpiece 10 are in contact, and switching element 17 for opening or closing a current path so as to block welding output from entering material contact detection unit 15 during welding.

The operation of the automatic welding equipment as configured above is described next. First, the operation after completing welding is described. After completing welding, power from power section 2 supplied between welding torch 6 and workpiece 10, which is required for welding, is stopped. Then, switching element 17 is turned on immediately after completing welding, so as to supply a voltage of typically about 5 V to 20 V between welding material 9 and workpiece 10 from material contact detection power section 16. It is apparent that the voltage is not limited to this range. At this point, power section 2 does not apply voltage between welding torch 6 and workpiece 10. Accordingly, power section 2 and material contact detection power section 16 do not connect and are damaged even if welding material 9, workpiece 10, and welding torch 6 make contact.

If welding material 9 and workpiece 10 are not in contact, material voltage detector 13 detects the voltage, for example, as high as 5 V to 20 V. However, if welding material 9 and workpiece 10 are in contact, the detected voltage falls to close to 0 V. Accordingly, after completing welding, material contact detector 14 can detect the contact state of welding material 9 and workpiece 10 by setting an appropriate threshold voltage of typically about 3 V.

However, in this structure, the bead shape in starting welding is variable. The reason is described with reference to FIG. 2, which is an operational timing chart for each part of the automatic welding equipment shown in FIG. 1. In particular, this chart details operational timings in starting welding.

In this automatic welding equipment, power section 2 supplies the power required for welding in starting welding. Accordingly, switching element 17 is turned off in advance so as to avoid damaging power section 2 and material contact detection power section 16 by connecting to each other. Material voltage detector 13 thus cannot detect the voltage between welding material 9 and workpiece 10. Consequently, material contact detector 14 cannot detect whether or not the tip of welding material 9 is in contact with workpiece 10 in starting welding.

Figure 2:
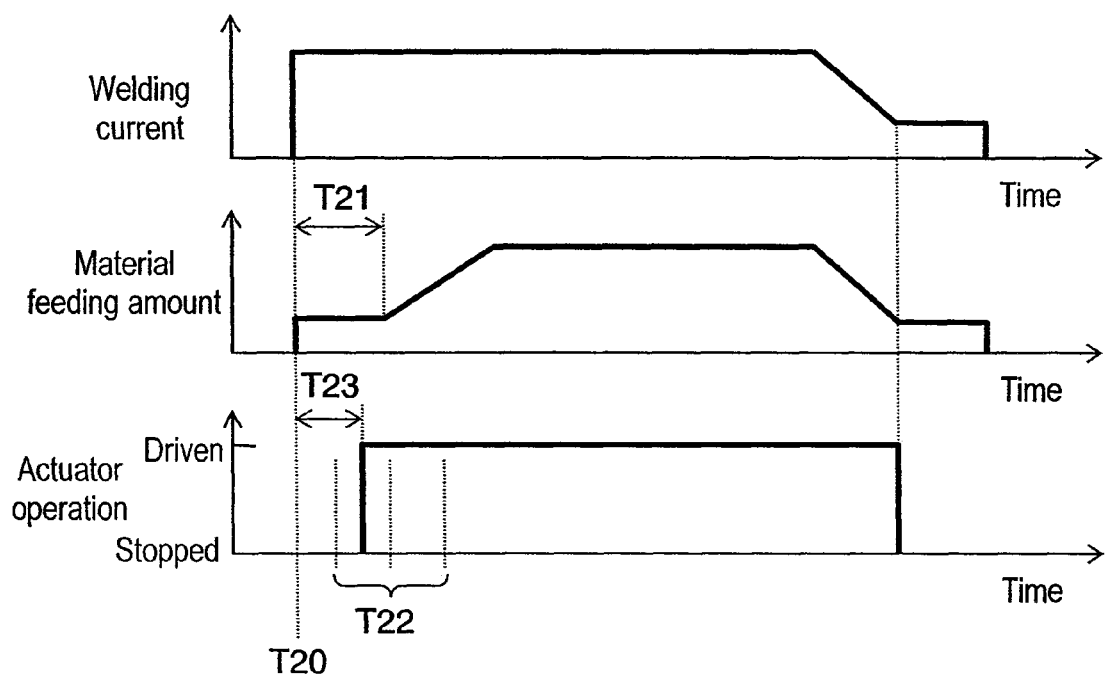
FIG. 2 is an operational timing chart of each part of the automatic welding equipment.

When welding starts, a high-frequency voltage of typically about 10 kV to 15 kV is applied between non-consumable electrode 11 and workpiece 10 so as to produce arc between non-consumable electrode 11 and workpiece 10. Alternatively, non-consumable electrode 11 and workpiece 10 are first placed in contact, and then separated while applying a voltage of about 10 V to 20 V. Once welding starts, the applied voltage is controlled to typically about 10 V to 40 V. Accordingly, material contact timing T22 at which welding material 9 makes contact with workpiece 10 after starting the feeding of welding material 9 is variable. FIG. 2 gives three material contact timings T22 to illustrate that this timing varies.

As shown in FIG. 2, an arc is produced between non-consumable electrode 11 and workpiece 10, and the welding current flows at timing T20. Controller 3 detects this timing T20 on receiving a signal from power section 2, and starts feeding welding material 9 from timing T20. As described above, since switching element 17 is turned off in advance, contact between welding material 9 and workpiece 10 is not detectable in starting welding. In addition, welding current, and feeding of welding material 9, and the operation of actuator 7 are controlled independently, beginning from timing T20. Their operations are made to start after predetermined time T21 and predetermined time T23, regardless of the welding state. Predetermined time T21 is, for example, about 0.1 sec to 0.5 sec, and predetermined time T23 is about 0.1 to 1 sec. However, these times differ depending on welding conditions and workpieces, and thus are not limited to these durations.

If welding contact timing T22 in FIG. 2 occurs early, welding material 9 is fed in spite of workpiece 10 being insufficiently heated. Accordingly, only partial melting of welding material 9 occurs. Contrarily, if material contact timing T22 is late, workpiece 10 is excessively heated, and results in being melted itself. Or, actuator 7 may start its operation before sufficient welding material 9 is supplied. In this case, the weld bead may be absent in starting welding, causing defective welding.

Since the tip position of welding material 9 is not detectable in starting welding, the timing of the contact between welding material 9 and workpiece 10 and transfer of welding material 9 to workpiece 10 after producing the arc cannot be controlled. Accordingly, the arcing timing, the contact timing of welding material 9 and workpiece 10, and the actuator movement starting time are not synchronized. As a result, the bead in starting welding may melt off due to excessive heating, or defective welding may occur due to insufficient melting caused by insufficient heating. In addition, the bead may be absent in starting welding due to starting of the operation of actuator 7 before welding material 9 and workpiece 10 come into contact.

In the automatic welding equipment examined by the inventors of the present invention, material contact detection unit 15 for detecting the contact of welding material 9 and workpiece 10 is provided separately from welding control unit 31. In this case, material contact detection unit 15 becomes large due to its large number of components, resulting in higher cost and space requirements. Still more, erroneous operation may occur due to the effect of external noise while sending a contact detection signal from material contact detection unit 15 to welding control unit 31. Or, a noise-suppression measures needs to be applied.

Accordingly, the inventors of the present invention further studied the equipment, and arrived at the idea of the automatic welding equipment of the present invention.

Next, the exemplary embodiments of the present invention are described with reference to drawings.

First Exemplary Embodiment

Figure 3:
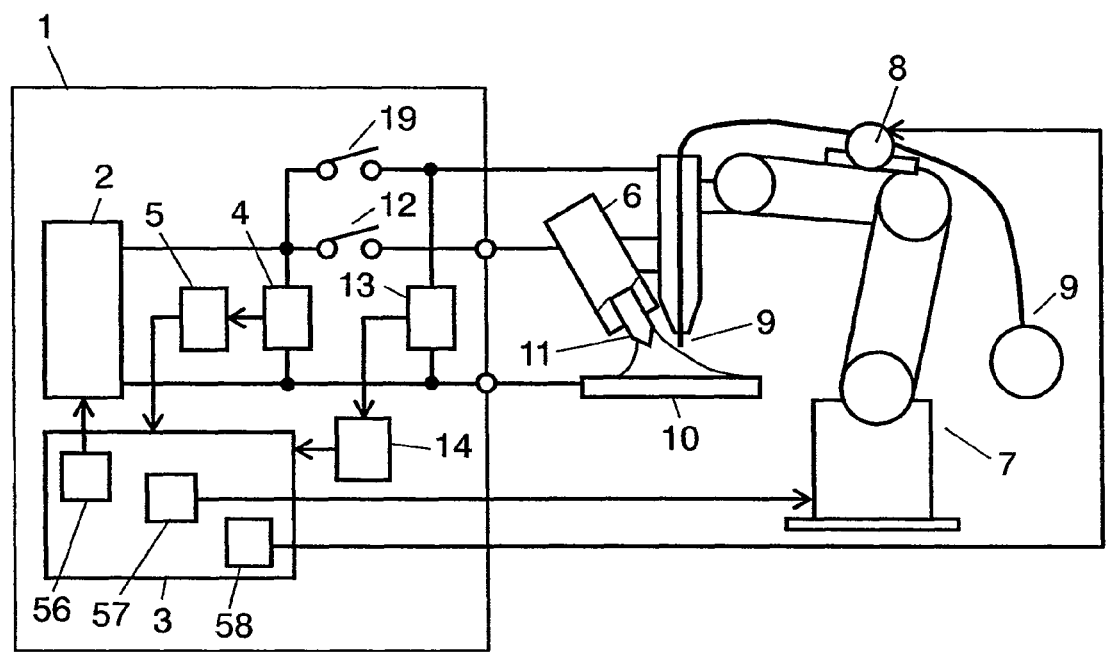
FIG. 3 is a schematic view of automatic welding equipment in accordance with a first exemplary embodiment of the present invention.

The automatic welding equipment in the first exemplary embodiment is described with reference to FIG. 3, which is a schematic view of the automatic welding equipment in this exemplary embodiment. In FIG. 3, the automatic welding equipment is mainly configured with welding control unit 1 and actuator 7. Actuator 7 is typically an industrial robot.

Welding control unit 1 includes power section 2 for supplying voltage between non-consumable electrode 11 and workpiece 10 and between welding material 9 and workpiece 10, controller 3 for controlling the operation of actuator 7 or feeding by material feeder 8, and non-consumable electrode voltage detector 4 for detecting a welding voltage that is voltage between non-consumable electrode 11 and workpiece 10. Welding control unit 1 also includes non-consumable electrode contact detector 5 for detecting contact of non-consumable electrode 11 and workpiece 10 based on an output of this non-consumable electrode voltage detector 4. When non-consumable electrode 11 and workpiece 10 are not in contact, non-consumable electrode voltage detector 4 detects high voltage. However, if non-consumable electrode 11 and workpiece 10 are in contact, the detected voltage falls to close to 0 V. Accordingly, non-consumable electrode contact detector 5 can detect the contact state of non-consumable electrode 11 and workpiece 10 by setting an appropriate threshold voltage. Non-consumable electrode contact detector 5 then outputs its detection signal to controller 3.

Welding control unit 1 has first switch 12 for electrically connecting power section 2 and non-consumable electrode 11, and second switch 19 for electrically connecting power section 2 and welding material 9. However, these first switch 12 and second switch 19 may be provided outside of welding control unit 1. In addition, controller 3 may control on and off of these first switch 12 and second switch 19.

Welding control unit 1 also includes material voltage detector 13 for measuring voltage between welding material 9 and workpiece 10, and material contact detector 14 for detecting contact of welding material 9 and workpiece 10 based on an output of material voltage detector 13. If welding material 9 and workpiece 10 are not in contact, material voltage detector 13 detects high voltage. However, if welding material 9 and workpiece 10 are in contact, the detected voltage falls to close to 0 V. Accordingly, material contact detector 14 can detect the contact state of welding material 9 and workpiece 10 by setting an appropriate threshold voltage. Material contact detector 14 then outputs its detection signal to controller 3.

Welding torch 6 with non-consumable electrode 11 and material feeder 8 for feeding welding material 9 are provided on actuator 7.

A major difference between the automatic welding equipment that the inventors have examined and described with reference to FIG. 1 and the automatic welding equipment in this exemplary embodiment is that power section 2 supplies voltage between non-consumable electrode 11 and workpiece 10 and between welding material 9 and workpiece 10. In other words, material contact detection power section 16 is eliminated by sharing the use of power section 2. Another difference is that material voltage detector 13 and material contact detector 14 are built inside welding control unit 1.

The operation of the automatic welding equipment in the exemplary embodiment as configured above is described with reference to FIG. 3. First, the operation for detecting contact of welding material 9 and workpiece 10 after completing welding is described. Next, the operation for detecting contact of non-consumable electrode 11 and workpiece 10 after completing welding is described. Then, the operation in starting welding is described.

Power section 2 is controlled to apply a voltage of about 10 V to 40 V between non-consumable electrode 11 and workpiece 10 during welding. Then, after completing welding, power section 2 first stops supplying power needed for welding between non-consumable electrode 11 and workpiece 10. First switch 12 is then turned off. Next, second switch 19 is turned on so that power section 2 supplies a voltage of typically about 5 V to 20V between welding material 9 and workpiece 10. If welding material 9 and workpiece 10 are not in contact, material voltage detector 13 detects a high voltage of typically about 5V to 20 V. However, if welding material 9 and workpiece 10 are in contact, the detected voltage falls to close to 0 V. Accordingly, material contact detector 14 can detect the contact state of welding material 9 and workpiece 10 by setting an appropriate threshold voltage of typically about 3 V.

If welding material 9 and workpiece 10 are in contact (welded), controller 3 at least alerts an operator that they are in contact, or stops the operation of actuator 7. This prevents welding material 9 from moving while welding material 9 and workpiece 10 are in contact, and also prevents workpiece 10 and welding material 9 from being damaged. The alert may take the form of indication of contact on a display (not illustrated), or a sound generated from an audio source such as a buzzer (not illustrated) or a sound generator.

When welding material 9 and workpiece 10 are in contact (welded), controller 3 stops the feeding operation of material feeder 8 so that the movement of welding material 9 is stopped and held. To detect the voltage between welding material 9 and workpiece 10, a voltage detection point of welding material 9 may be either near welding torch 6 or near material feeder 8. This is because the voltage detection point does not significantly affect the voltage level to be detected.

Next, the operation for detecting contact of non-consumable electrode 11 and workpiece 10 after completing welding is described. After welding is completed, first switch 12 is turned on, and second switch 19 is turned off. Then, power section 2 supplies a voltage of typically about 5V to 20 V between non-consumable electrode 11 and workpiece 10. The voltage applied at this point does not produce an arc between non-consumable electrode 11 and workpiece 10. If non-consumable electrode 11 and workpiece 10 are not in contact, non-consumable electrode voltage detector 4 detects a high voltage of about 5V to 20 V. However, if non-consumable electrode 11 and workpiece 10 are in contact, the detected voltage falls to close to 0 V. Accordingly, non-consumable electrode contact detector 5 can detect the contact state of non-consumable electrode 11 and workpiece 10 by setting an appropriate threshold voltage of typically about 3 V.

If non-consumable electrode 11 and workpiece 10 are in contact (welded), controller 3 stops and holds the operation of actuator 7. This prevents non-consumable electrode 11 from moving while non-consumable electrode 11 and workpiece 10 are in contact, and also prevents workpiece 10 and non-consumable electrode 11 from being damaged. In addition, the contact (weld) may be alerted if non-consumable electrode 11 and workpiece 10 are in contact. The alert may take the form of indication of contact on a display (not illustrated), or a sound generated from an acoustic source such as a buzzer (not illustrated) or a sound generator.

If welding material 9 and workpiece 10 are not in contact, and non-consumable electrode 11 and workpiece 10 are also not in contact, controller 3 of welding control unit 1 operates actuator 7 so as to continue a predetermined subsequent operation of each section, including movement of welding torch 6 to a retracted position.

As described above, material voltage detector 13 and material contact detector 14 are built in welding control unit 1 of the automatic welding equipment in this exemplary embodiment. In addition, power section 2 supplies voltage applied between welding material 9 and workpiece 10 and voltage applied between non-consumable electrode 11 and workpiece 10, so as to detect contact of welding material 9 and workpiece 10. Accordingly, material contact detection power section 16 needed in the automatic welding equipment shown in FIG. 1 is eliminated, and thus separate material contact detection unit 15 can be eliminated.

Since the need of sending a contact detection signal from material contact detection unit 15 to welding control unit 31 via an external communication line, which is needed in the automatic welding equipment shown in FIG. 1, can be eliminated, the equipment is not affected by noise. Accordingly, no noise suppression measure is needed. Furthermore, the number of components is less than that of the automatic welding equipment shown in FIG. 1, achieving cost reduction. A space for installing separate material contact detection unit 15 also becomes unnecessary.

The automatic welding equipment in this exemplary embodiment refers to an example of detecting the contact (weld) of welding material 9 and workpiece 10 and the contact (weld) of non-consumable electrode 11 and workpiece 10. However, the present invention may also be configured to control each section by detecting only the contact (weld) of welding material 9 and workpiece 10 or only the contact (weld) of non-consumable electrode 11 and workpiece 10.

Each component in this exemplary embodiment may be either an independent component or a component combining multiple members. In other words, the exemplary embodiment gives an example in which controller 3 controls the operation of actuator 7 and feeding by material feeder 8. However, controller 3 may also be divided, and a controller for each function may be separately provided: power controller 5 for controlling power section 2, actuator controller 57 for controlling actuator 7, and material feeding controller 58 for controlling material feeder 8.

Figure 4:
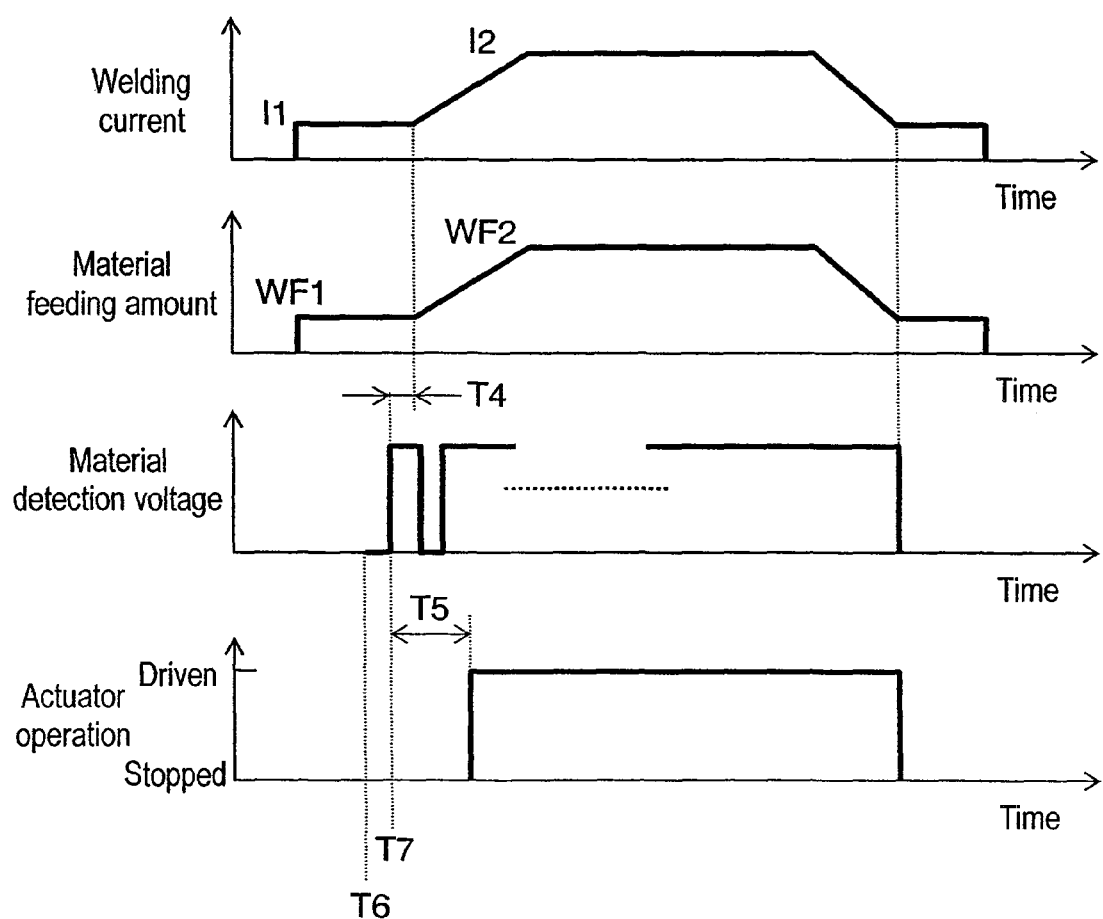
FIG. 4 is an operational timing chart of each part of the automatic welding equipment in accordance with the first exemplary embodiment of the present invention.

Next, the operation of the automatic welding equipment in starting welding in this exemplary embodiment is described with reference to FIG. 4, which is an operational timing chart of each part of the automatic welding equipment in this exemplary embodiment.

In starting welding, first switch 12 is first turned on, and second switch 19 is turned off. In other words, no voltage is applied between welding material 9 and workpiece 10. To start welding, power section 2 applies a high-frequency voltage of typically about 10 kV to 15 kV between non-consumable electrode 11 and workpiece 10. Alternatively, non-consumable electrode 11 and workpiece 10 are placed in contact, and then separated while applying a voltage of about 10 V to 20 V. In this way, an arc is produced between non-consumable electrode 11 and workpiece 10. Once welding starts, power section 2 is controlled to apply a voltage of typically 10 V to 40 V.

Material feeder 8 feeds welding material 9 to the point where the arc has been produced. Consequently, welding material 9 makes contact with workpiece 10 at material contact timing T6. Since no voltage is applied between welding material 9 and workpiece 10 immediately before making contact, material contact timing T6, shown in FIG. 4, which is the timing at which welding material 9 and workpiece 10 are placed in contact, cannot be detected. While welding material 9 and workpiece 10 are in contact, material voltage detector 13 detects that welding material 9 and workpiece 10 have the same potentials (0 V).

Since non-consumable electrode 11 is closer in distance to welding material 9 than to workpiece 10, an arc is also produced between welding material 9 and non-consumable electrode 11. The tip of welding material 9 is then heated and melted, releasing its contact with workpiece 10. As a result, a voltage of about 10 V, for example, is generated between welding material 9 and workpiece 10 at material contact release timing T7 shown in FIG. 4. This voltage is caused by the arc generated between welding material 9 and non-consumable electrode 11. Material voltage detector 13 detects this generated voltage. Material contact detector 14 then detects material contact release timing T7 at which the contact is released by comparing the generated voltage with a threshold voltage (e.g., about 5 V). In other words, material contact detector 14 can detect the timing at which the contact is released after detecting the contact of welding material 9 and workpiece 10 in starting welding.

When predetermined time T4 has elapsed after this material contact release timing T7, controller 3 starts increasing the welding current from a low level of welding startup current I1 to main welding current I2. In other words, controller 3 increases the power supplied between non-consumable electrode 11 and workpiece 10 from power for starting arc to power for main welding, which is higher than the power for starting arc, when predetermined time T4 has elapsed after the timing at which the contact is released. Predetermined time T4 is typically about 0.2 sec to 0.3 sec. Welding startup current I1 is about 10 A, and main welding current I2 is higher than 10 A: about 500 A. However, welding startup current I1, main welding current I2, and predetermined time T4 are determined based on welding conditions, workpiece 10, and so on, and thus differ according to these conditions. Material feeder 8 starts accelerating the feeding of welding material 9 from a low level (WF1) at welding startup to high level (WF2) for main welding. In other words, material feeding controller 58 controls material feeder 8 such that it accelerates the feeding speed of welding material 9, synchronizing with the increase in welding current, when predetermined time T4 has elapsed after the contact of welding material 9 is released. This applies an appropriate level of heat without excess or deficiency to workpiece 10. Insufficient heating of workpiece 10 or meltdown of workpiece 10 is also preventable. As a result, the stability of bead formation in starting welding can be improved.

When predetermined T5 has elapsed after material contact release timing T7, actuator controller 57 operates actuator 7 so as to start moving welding torch 6 toward a weld line. Predetermined time T5 is typically 0.1 sec to 1 sec. However, predetermined time T5 is determined based on welding conditions, workpiece 10, and so on, and thus differs according to these conditions. This way of control prevents starting of movement of actuator 7 before welding material 9 is sufficiently supplied. As a result, the stability of bead formation in starting welding can be improved.

The above example refers to an increase of the welding current and material feeding amount when a predetermined time has elapsed after detecting material contact release timing T7. However, controller 3 may start increasing the welding current and material feeding amount immediately after material contact release timing T7 is detected. Or, actuator 7 may be immediately operated to start moving welding torch 6 toward the weld line. In other words, the controls described above may start at any time between detection of material contact release timing T7 and a predetermined time. How the equipment is controlled is determined based on welding conditions, a material of workpiece 10, and so on.

Second Exemplary Embodiment

Automatic welding equipment in the second exemplary embodiment of the present invention is described with reference to FIG. 5, which is a schematic view of the automatic welding equipment in this exemplary embodiment. In the second exemplary embodiment, components same as those in the first exemplary embodiment are given the same reference marks to omit duplicate description in details.

The first exemplary embodiment gives an example of the operation after completing welding in which material voltage detector 13 detects voltage between welding material 9 and workpiece 10, and then material contact detector 14 detects the contact of welding material 9 and workpiece 10 so as to enable controller 3 to control each section of the automatic welding equipment. In the second exemplary embodiment, however, the contact of welding material 9 and workpiece 10 is detected by detecting the current running in welding material 9 so as to enable controller 3 to control each part of the automatic welding equipment.

Figure 5:
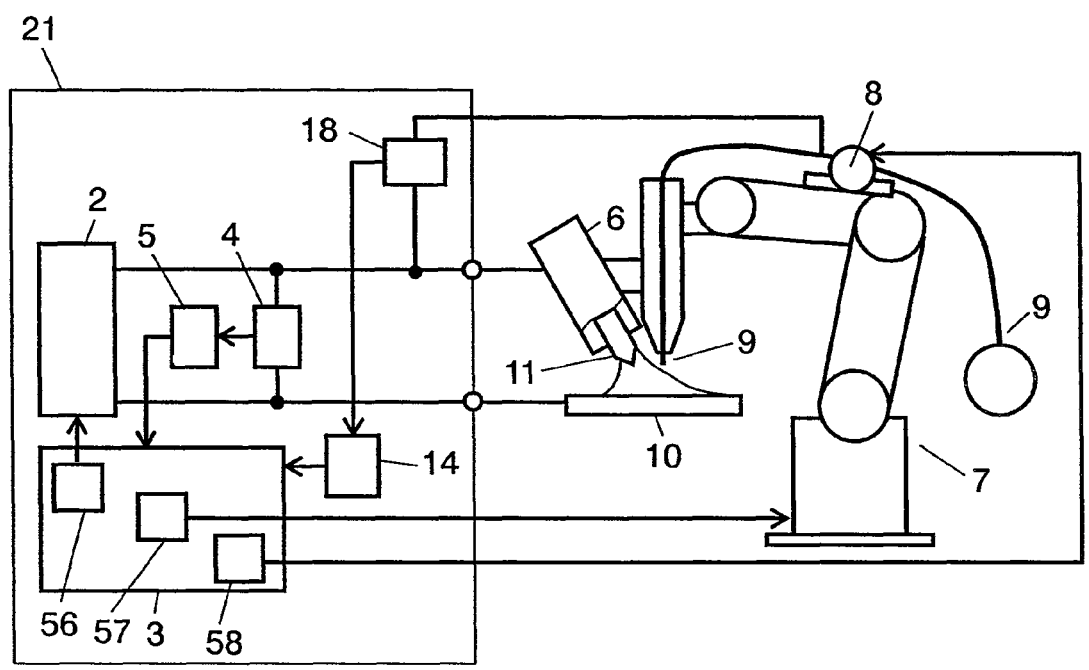
FIG. 5 is a schematic view of automatic welding equipment in a second exemplary embodiment of the present invention.

Accordingly, a major difference between the first exemplary embodiment and the second exemplary embodiment is that material voltage detector 13, first switch 12, and second switch 19 shown in FIG. 3 are eliminated; and instead, material current detector 18 for detecting the current running in welding material 9 is provided, as shown in FIG. 5. In addition, the side of power section 2 connected to non-consumable electrode 11 is electrically connected to welding material 9 via material current detector 18.

Next, the operation of the automatic welding equipment as configured above is described. First, the operation for detecting contact of welding material 9 and workpiece 10 after completing welding is described. Then, the operation for detecting contact of non-consumable electrode 11 and workpiece 10 after completing welding is described.

During welding, power section 2 is controlled to apply a voltage of typically about 10 V to 40V between non-consumable electrode 11 and workpiece 10. Then, after completing welding, power section 2 first stops supplying power needed for welding between non-consumable electrode 11 and workpiece 10. Power section 2 then applies a voltage of typically about 5 V to 20 V between welding material 9 and workpiece 10 for detecting contact between welding material 9 and workpiece 10. If welding material 9 and workpiece 10 are not in contact, material current detector 18 detects current close to 0 A. However, if welding material 9 and workpiece 10 are in contact, the detected current becomes typically 10 mA or above based on the applied voltage and a resistance of welding material 9. Accordingly, material contact detector 14 can detect the contact state of welding material 9 and workpiece 10 by setting an appropriate threshold current of typically about 5 mA.

If welding material 9 and workpiece 10 are in contact (welded), at least the operation of actuator 7 is stopped, or the feeding operation of material feeder 8 is stopped. This prevents welding material 9 from moving while welding material 9 and workpiece 10 are in contact, and also prevents workpiece 10 and welding material 9 from being damaged. In addition, if they are in contact (welded), the contact may be alerted. The alert may take the form of indication of contact on a display (not illustrated), or a sound generated from an audio source such as a buzzer (not illustrated) or a sound generator.

Next, the operation for detecting the contact of non-consumable electrode 11 and workpiece 10 after completing welding is described.

After completing welding, power section 2 supplies a voltage of typically about 5 V to 20 V between non-consumable electrode 11 and workpiece 10. The voltage applied at this point does not produce an arc between non-consumable electrode 11 and workpiece 10. If non-consumable electrode 11 and workpiece 10 are not in contact, non-consumable electrode voltage detector 4 detects the voltage as high as about 5 V to 20 V. However, if non-consumable electrode 11 and workpiece 10 are in contact, the detected voltage falls to close to 0 V. Accordingly, non-consumable electrode contact detector 5 can detect the contact state of non-consumable electrode 11 and workpiece 10 by setting an appropriate threshold voltage of typically about 3 V.

If non-consumable electrode 11 and workpiece 10 are in contact (welded), actuator controller 57 stops and holds the movement of actuator 7. This prevents non-consumable electrode 11 from moving while non-consumable electrode 11 and workpiece 10 are in contact, and also prevents workpiece 10 and non-consumable electrode 11 from being damaged. In addition, if they are in contact (welded), actuator controller 57 may alert an operator that they are in contact. The alert may take the form of indication of contact on a display (not illustrated), or a sound generated from an audio source such as a buzzer (not illustrated) or a sound generator.

If welding material 9 and workpiece 10 are not in contact and non-consumable electrode 11 and workpiece 10 are also not in contact, controller 3 of welding control unit 21 operates actuator 7 so as to continue a predetermined operation of each part, including movement of welding torch 6 to a retracted position.

As described above, the automatic welding equipment in this exemplary embodiment eliminates material contact detection power section 16 needed in the automatic welding equipment shown in FIG. 1. Separate material contact detection unit 15 can also be eliminated. In addition, the need of sending a contact detection signal from material contact detection unit 15 to welding control unit 31 via an external communication line, which is needed in the conventional automatic welding equipment, can be eliminated. Accordingly, the equipment is not affected by the noise, and thus no noise-suppression measure is needed. Furthermore, the number of components can be reduced, compared to the conventional automatic welding equipment, resulting in cost reduction. A space needed for installing separate material contact detection unit 15 can also be eliminated.

A component such as a photo-coupler that outputs a signal depending on a predetermined current threshold may also be used in place of material current detector 18 and material contact detector 14 for determining whether or not welding material 9 and workpiece 10 are in contact. The use of such component enables further reduction of the number of components, achieving further cost reduction and space-saving.

In the automatic welding equipment in this exemplary embodiment shown in FIG. 5, material current detector 18 is built in welding control unit 21. Alternatively, material current detector 18 may be built in actuator 7.

The automatic welding equipment in this exemplary embodiment refers to an example of detecting the contact (weld) of welding material 9 and workpiece 10, and the contact (weld) of non-consumable electrode 11 and workpiece 10. However, the present invention may also be configured to control each section by detecting only the contact (weld) of welding material 9 and workpiece 10 or only the contact (weld) of non-consumable electrode 11 and workpiece 10.

Figure 6:
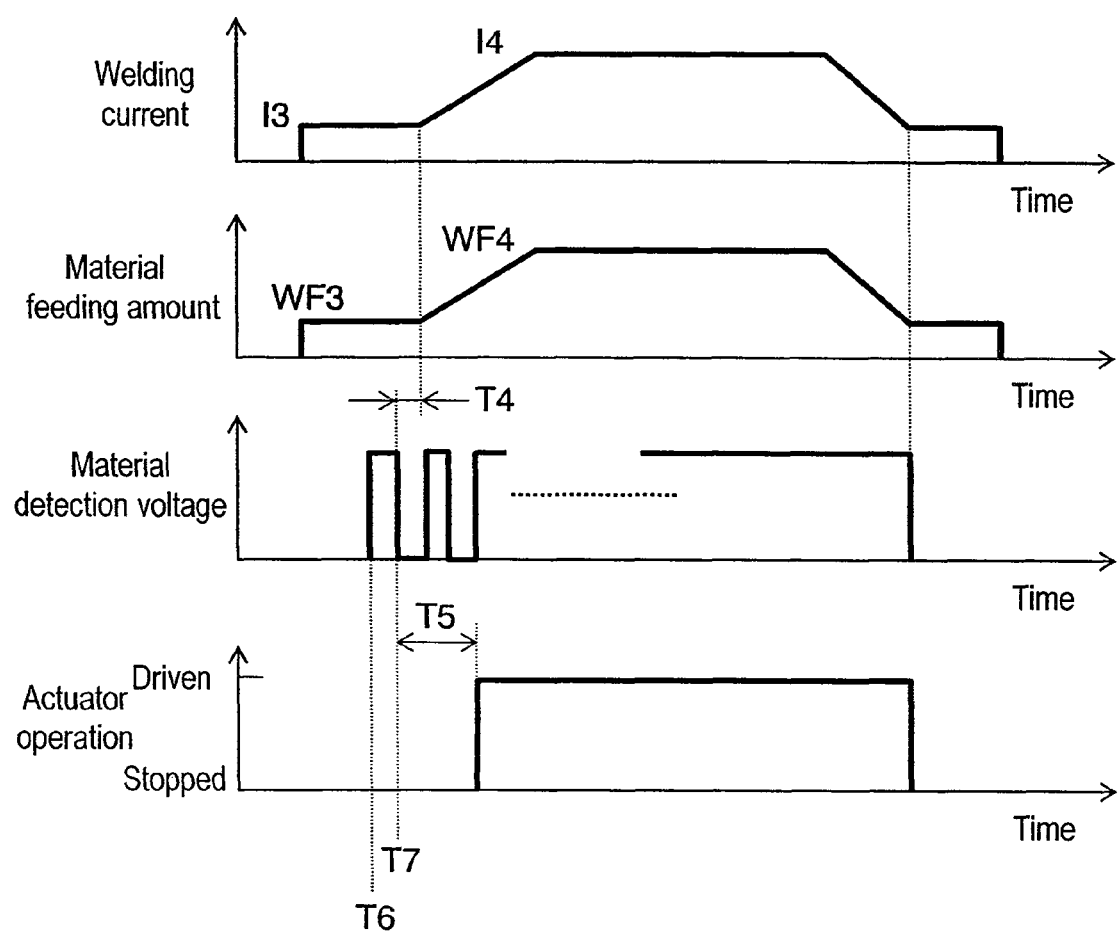
FIG. 6 is an operational timing chart of each part of the automatic welding equipment in the second exemplary embodiment of the present invention.
Figure 7:
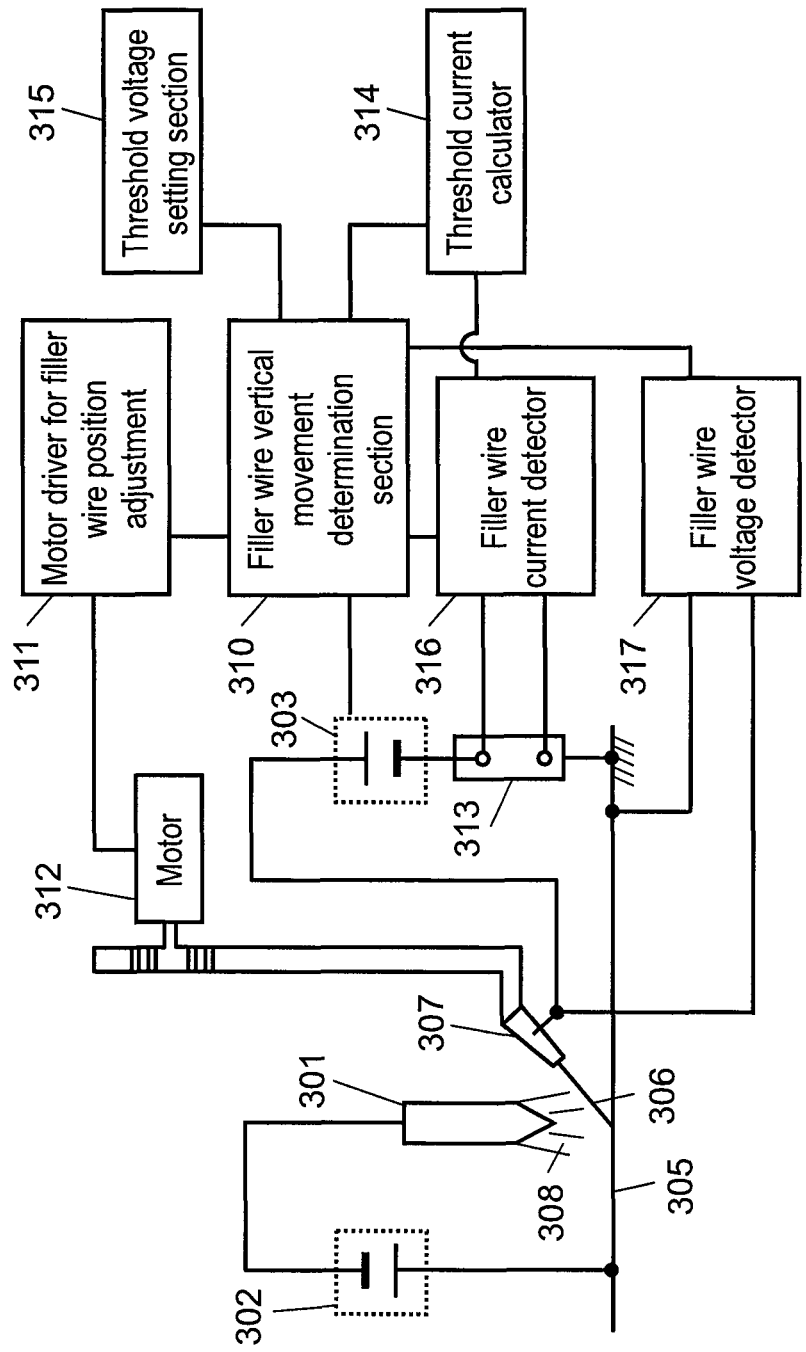
FIG. 7 is a schematic view of conventional automatic welding equipment.

Next, the operation in starting welding of the automatic welding equipment in this exemplary embodiment is described with reference to FIG. 6, which is an operational timing chart of each part of the automatic welding equipment in this exemplary embodiment.

In starting welding, power section 2 applies a high-frequency voltage typically of about 10 kV to 15 kV between non-consumable electrode 11 and workpiece 10. Alternatively, non-consumable electrode 11 and workpiece 10 are placed in contact, and then separated while applying a voltage of about 10 V to 20 V. In this way, an arc is produced between non-consumable electrode 11 and workpiece 10. Once welding starts, power section 2 is controlled to apply a voltage of typically about 10 V to 40 V.

Material feeder 8 feeds welding material 9 to the point where the arc has been produced. Consequently, welding material 9 makes contact with workpiece 10 at material contact timing T6. While welding material 9 and workpiece 10 are in contact, their potentials become the same. Since non-consumable electrode 11 is closer in distance to welding material 9 than to workpiece 10, an arc is also produced between welding material 9 and non-consumable electrode 11. At this point, three current paths are established from power section 2. The first path is from workpiece 10, through non-consumable electrode 11, and to power section 2. The second path is from workpiece 10, through welding material 9, and to power section 2. The third path is from workpiece 10, welding material 9, material current detector 18, and to power section 2. Accordingly, when welding material 9 and workpiece 10 are in contact, material current detector 18 detects the current, and thus the contact timing of welding material 9 and workpiece 10 is detectable as shown by material contact timing T6 in FIG. 6.

Then, a tip of welding material 9 is heated, and melted so that the contact between welding material 9 and workpiece 10 is released. As a result, the current running in welding material 9 falls low or 0 A. Accordingly material contact release timing T7, that is a timing at which the contact between welding material 9 and workpiece 10 is released, can be detected by detecting the current.

Controller 3 starts increasing the welding current at a low level (I3) in starting welding to main welding current (I4) when predetermined time T4 has elapsed after this material contact release timing T7. In other words, controller 3 starts increasing the power supplied between non-consumable electrode 11 and workpiece 10 from power for starting arc to power for main welding, that is higher than the power for starting arc, when predetermined time T4 has elapsed after timing T7 at which the contact is released. Predetermined time T4 is determined based on welding conditions, workpiece 10, and so on. For example, predetermined time T4 is about 0.2 sec to 0.3 sec. The feeding of welding material 9 also starts acceleration from a low level (WF3) in starting welding to high level (WF4) for main welding. In other words, controller 3 synchronizes an increase of the feeding amount of welding material 9 and an increase of the welding current, when a predetermined time has elapsed after the contact of welding material 9 is released. This applies an appropriate level of heat without excess or deficiency to workpiece 10. Insufficient heating of workpiece or meltdown of workpiece 10 is also preventable. As a result, the stability of bead formation in starting welding can be improved.

Controller 3 operates actuator 7 to move welding torch 6 toward a weld line when predetermined time T5 has elapsed after material contact release timing T7. Predetermined time T5 is determined based on welding conditions, workpiece 10, and so on. This prevents actuator 7 from starting its movement before welding material 9 is sufficiently supplied. As a result, the stability of bead formation in starting welding can be improved.

In the above description, the welding current and material feeding amount are increased when predetermined time T5 has elapsed after detecting material contact release timing T7. However, controller 3 may also start increasing the welding current and material feeding amount immediately after material contact release timing T7 is detected. Or, actuator 7 may be immediately operated. Alternatively, controller 3 may control the welding current, material feeding amount, and operation of actuator 7 when a predetermined time has elapsed after detecting material contact timing T6 and before material contact release timing T7. Or, controller 3 may control the welding current, material feeding amount, and operation of actuator 7 on detecting material contact timing T6. In other words, the control of welding current, material feeding amount, and operation of actuator 7 may start at any time before a predetermined time. Whether the control is needed is determined based on welding conditions, a material of workpiece 10, and so on.

INDUSTRIAL APPLICABILITY

The inexpensive and space-saving automatic welding equipment of the present invention can detect the contact of welding material, and stabilizes the bead shape in starting welding. Accordingly, the automatic welding equipment of the present invention is effective for industrial purposes involving the contact (weld) of the welding material and workpiece.

The invention claimed is:

1. Automatic welding equipment comprising:
a welding torch with a non-consumable electrode;
an actuator for holding the welding torch, and moving the welding torch;
a material feeder for feeding a welding material to a welding position;
a power section (i) for selectively supplying power between the non-consumable electrode and a workpiece and (ii) for selectively supplying power between the welding material and the workpiece;
a non-consumable electrode voltage detector for detecting voltage between the non-consumable electrode and the workpiece;
a non-consumable electrode contact detector for detecting contact of the non-consumable electrode and the workpiece by receiving an output from the non-consumable electrode voltage detector;
an actuator controller for controlling the actuator based on a detection result of the non-consumable electrode voltage detector;
a first switch for electrically connecting the power section and the non-consumable electrode;
a second switch for electrically connecting the power section and the welding material; and
a power controller for controlling the power section;
wherein after completing welding, the first switch is turned on, and the second switch is turned off, such that the non-consumable electrode contact detector detects whether or not the non-consumable electrode and the workpiece are in contact with each other,
wherein when the non-consumable electrode and the workpiece are in contact with each other,
the actuator controller executes at least one of an operation for alerting the contact of the non-consumable electrode and the workpiece, and an operation for stopping and holding movement of the non-consumable electrode by the actuator.

2. Automatic welding equipment comprising:
a welding torch with a non-consumable electrode;
an actuator for holding the welding torch, and moving the welding torch;
a material feeder for feeding a welding material to a welding position;
a power section (i) for selectively supplying power between the non-consumable electrode and a workpiece, and (ii) for selectively supplying power between the welding material and the workpiece;
a material voltage detector for detecting voltage between the welding material and the workpiece;
a material contact detector for detecting contact of the welding material and the workpiece by receiving an output from the material voltage detector;
an actuator controller for controlling the actuator based on a detection result of the material contact detector;
a first switch for electrically connecting the power section and the non-consumable electrode;
a second switch for electrically connecting the power section and the welding material; and
a power controller for controlling the power section;
wherein at a start of welding, the first switch is turned on, and the second switch is turned off,
wherein the power controller is programmed to increase power supplied between the non-consumable electrode and the workpiece from a power for starting an arc to a power for main welding which is higher than the power for starting the arc when the material contact detector detects a timing at which the contact is released after detecting the contact of the welding material and the workpiece at the start of welding, based on the timing at which the contact is released,
wherein the material contact detector detects whether or not the welding material and the workpiece are in contact with each other after completing welding,
wherein when the welding material and the workpiece are in contact with each other,
the actuator controller executes at least one of an operation for alerting the contact of the welding material and the workpiece, and an operation for stopping and holding movement of the welding material by the actuator.

3. Automatic welding equipment comprising:
a welding torch with a non-consumable electrode;
an actuator for holding the welding torch, and moving the welding torch;

a material feeder for feeding a welding material to a welding position;
a power section (i) for selectively supplying power between the non-consumable electrode and a workpiece and (ii) for selectively supplying power between the welding material and the workpiece;
a material voltage detector for detecting voltage between the welding material and the workpiece;
a material contact detector for detecting contact of the welding material and the workpiece by receiving an output from the material voltage detector;
a non-consumable electrode voltage detector for detecting voltage between the non-consumable electrode and the workpiece;
a non-consumable electrode contact detector for detecting contact between the non-consumable electrode and the workpiece by receiving an output from the non-consumable electrode voltage detector;
an actuator controller for controlling the actuator based on a detection result of at least one of the material contact detector and the non-consumable electrode contact detector;
a first switch for electrically connecting the power section and the non-consumable electrode;
a second switch for electrically connecting the power section and the welding material; and
a power controller for controlling the power section;
wherein at a start of welding, the first switch is turned on, and the second switch is turned off,
wherein the power controller is programmed to increase power supplied between the non-consumable electrode and the workpiece from a power for starting an arc to a power for main welding which is higher than the power for starting the arc when the material contact detector detects a timing at which the contact is released after detecting the contact of the welding material and the workpiece at the start of welding, based on the timing at which the contact is released,
wherein the material contact detector detects whether or not the welding material and the workpiece are in contact with each other after completing welding,
wherein when the welding material and the workpiece are in contact with each other,
the actuator controller executes at least one of an operation for alerting the contact of the welding material and the workpiece, and an operation for stopping and holding movement of the welding material by the actuator; and
wherein the non-consumable electrode contact detector detects whether or not the non-consumable electrode and the workpiece are in contact with each other after completing welding,
wherein when the non-consumable electrode and the workpiece are in contact with each other,
the actuator controller executes at least one of an operation for alerting the contact of the non-consumable electrode and the workpiece, and an operation for stopping and holding movement of the non-consumable electrode by the actuator.

4. The automatic welding equipment of claim 2, further comprising:
a material feeding controller for controlling the material feeder based on a detection result of the material contact detector,
wherein the material contact detector detects whether or not the welding material and the workpiece are in contact with each other after completing welding,
wherein when the welding material and the workpiece are in contact with each other,
the material feeding controller stops and holds movement of the welding material by the material feeder.

5. The automatic welding equipment of claim 2,
wherein the power controller starts increasing the power after a predetermined time has elapsed from the timing at which the contact is released.

6. The automatic welding equipment of claim 2, further comprising:
a material feeding controller for controlling the material feeder based on a detection result of the material contact detector,
wherein the material feeding controller increases a feeding speed of the welding material synchronizing with an increase of power from the power for starting arc to the power for main welding.

7. The automatic welding equipment of claim 2,
wherein when the material contact detector detects a timing at which the contact is released after detecting the contact of the welding material and the workpiece in starting welding,
the actuator controller starts moving the welding torch toward a weld line by operating the actuator.

8. The automatic welding equipment of claim 2,
wherein when the material contact detector detects a timing at which the contact is released after detecting the contact of the welding material and the workpiece in starting welding,
the actuator controller starts moving the welding torch toward a weld line by operating the actuator after a predetermined time has elapsed from the timing at which the contact is released.

9. Automatic welding equipment comprising:
a welding torch with a non-consumable electrode;
an actuator for holding the welding torch and moving the welding torch;
a material feeder for feeding a welding material to a welding position;
a power section (i) for selectively supplying power between the non-consumable electrode and a workpiece and (ii) for selectively supplying power between the welding material and the workpiece;
a material current detector for detecting current running in the welding material, the material current detector being arranged between the welding material and the power section;
a material contact detector for detecting contact of the welding material and the workpiece when current detected by the material current detector exceeds a predetermined value;
an actuator controller for controlling the actuator based on a detection result of the material contact detector; and
a power controller for controlling the power section;
wherein at a start of welding, the power section supplies a power between the non-consumable electrode and the workpiece and between the welding material and the workpiece, and the material feeder feeds the welding material to a point where the arc has been produced,
wherein when the material contact detector detects a contact of the welding material and the workpiece at the start of welding, the power controller is programmed to increase power supplied between the non-consumable electrode and the workpiece from a power for starting an arc to a power for main welding which is higher than the power for starting the arc, wherein after completing welding, the power section stops supplying power between the non-consumable electrode and the workpiece, and supplies power between the welding material and the workpiece, and the material contact detector detects whether or not the welding material and the workpiece are in contact with each other after completing welding, wherein when the welding material and the workpiece are in contact with each other, the actuator controller executes at least one of an operation for alerting the contact of the welding material and the workpiece, and an operation for stopping and holding movement of the welding material by the actuator.

10. Automatic welding equipment comprising:

a welding torch with a non-consumable electrode;

an actuator for holding the welding torch and moving the welding torch;

a material feeder for feeding a welding material to a welding position;

a power section (i) for selectively supplying power between the non-consumable electrode and a workpiece and (ii) for selectively supplying power between the welding material and the workpiece;

a material current detector for detecting current running in the welding material, the material current detector being arranged between the welding material and the power section;

a material contact detector for detecting contact of the welding material and the workpiece when current detected by the material current detector exceeds a predetermined value;

a non-consumable electrode voltage detector for detecting voltage between the non-consumable electrode and the workpiece;

a non-consumable electrode contact detector for detecting contact of the non-consumable electrode and the workpiece by receiving an output from the non-consumable electrode voltage detector;

an actuator controller for controlling the actuator based on a detection result of one of the material contact detector and the non-consumable electrode contact detector; and a power controller for controlling the power section;

wherein at a start of welding, the power section supplies a power between the non-consumable electrode and the workpiece and between the welding material and the workpiece, and the material feeder feeds the welding material to a point where the arc has been produced, wherein when the material contact detector detects a contact of the welding material and the workpiece at the start of welding, the power controller is programmed to increase power supplied between the non-consumable electrode and the workpiece from a power for starting an arc to a power for main welding which is higher than the power for starting the arc, wherein after completing welding, the power section stops supplying power between the non-consumable electrode and the workpiece, and supplies power between the welding material and the workpiece, and the material contact detector detects whether or not the welding material and the workpiece are in contact with each other, wherein when the welding material and the workpiece are in contact with each other, the actuator controller executes at least one of an operation for alerting the contact of the welding material and the workpiece, and an operation for stopping and holding movement of the welding material by a operation of the actuator; and wherein after completing welding, the power section stops supplying power between the welding material and the workpiece, and supplies power between the non-consumable electrode and the workpiece, and the non-consumable electrode contact detector detects whether or not the non-consumable electrode and the workpiece are in contact with each other, wherein when the non-consumable electrode and the workpiece are in contact with each other, the actuator controller executes at least one of an operation for alerting the contact of the non-consumable electrode and the workpiece, and an operation for stopping and holding movement of the non-consumable electrode by the actuator.

11. The automatic welding equipment of claim 9, further comprising:

a material feeding controller for controlling the material feeder based on a detection result of the material contact detector;

wherein the material contact detector detects whether or not the welding material and the workpiece are in contact with each other after completing welding, wherein when the welding material and the workpiece are in contact with each other, the material feeding controller stops and holds movement of the welding material by the material feeder.

12. The automatic welding equipment of claim 9, wherein the power controller starts increasing the power after a predetermined time has elapsed from the detection of the contact.

13. The automatic welding equipment of claim 9, wherein the material feeding controller increases a feeding speed of the welding material synchronizing with an increase of power from the power for starting arc to the power for main welding.

14. The automatic welding equipment of claim 9, wherein when the material contact detector detects contact of the welding material and the workpiece in starting welding, the actuator controller starts moving the welding torch toward a weld line by the actuator.

15. The automatic welding equipment of claim 9, wherein when the material contact detector detects contact of the welding material and the workpiece in starting welding, the actuator controller starts moving the welding torch toward a weld line by the actuator after a predetermined time has elapsed from detection of the contact.

16. The automatic welding equipment of claim 9, wherein when the material contact detector detects a timing at which the contact is released after detecting contact of the welding material and the welding workpiece in starting welding, the actuator controller starts moving the welding torch toward a weld line by the actuator.

17. The automatic welding equipment of claim 9, wherein when the material contact detector detects a timing at which the contact is released after detecting the contact of the welding material and the workpiece in starting welding, the actuator controller starts moving the welding torch toward a weld line by the actuator after a predetermined time has elapsed from the timing at which the contact is released.

18. The automatic welding equipment of claim 3,
wherein the power controller starts increasing the power after a predetermined time has elapsed from the timing at which the contact is released.

19. The automatic welding equipment of claim 10, wherein the power controller starts increasing the power after a predetermined time has elapsed from the detection of the contact.

* * * * *